United States Patent [19]
Sugiyama et al.

[11] Patent Number: 5,368,664
[45] Date of Patent: Nov. 29, 1994

[54] PHOTOGRAPHIC FILM CASSETTE AND METHOD OF MANUFACTURING THE SAME

[75] Inventors: Nobuo Sugiyama; Naoko Yamashita, both of Kanagawa, Japan

[73] Assignee: Fuji Photo Film Co., Ltd., Kanagawa, Japan

[21] Appl. No.: 971,060

[22] Filed: Nov. 2, 1992

[30] Foreign Application Priority Data

Nov. 1, 1991 [JP] Japan .................... 3-287709
Mar. 31, 1992 [JP] Japan .................... 4-077856

[51] Int. Cl.$^5$ .................... B25B 9/00; G03B 17/26
[52] U.S. Cl. .................... 156/69; 156/73.1; 156/580.1; 156/580.2; 242/348.4; 354/275
[58] Field of Search .................... 156/69, 580.1, 580.2, 156/73.1; 242/71.1; 354/275

[56] References Cited

U.S. PATENT DOCUMENTS

| | | | |
|---|---|---|---|
| 3,404,613 | 10/1965 | MacGregor | 242/71.1 X |
| 3,537,376 | 11/1970 | Fleming | 95/67 X |
| 3,649,421 | 3/1972 | Berleyoung | 156/580.1 X |
| 3,661,661 | 5/1972 | Berleyoung | 156/580.1 X |
| 3,926,358 | 12/1975 | Hester | 156/580.1 X |
| 4,034,929 | 7/1977 | Ebner | 242/71.1 X |
| 4,074,870 | 2/1978 | Kaufman | 242/1 X |
| 4,090,897 | 5/1978 | Minick | 156/73.1 |
| 4,832,275 | 5/1989 | Robertson | 242/71.1 |
| 4,834,306 | 5/1989 | Robertson et al. | 242/71.1 |
| 4,972,649 | 11/1990 | Mochida | 156/69 X |
| 5,170,199 | 12/1992 | Nakai | 354/126 X |
| 5,219,128 | 6/1993 | Mizuno | 242/71.1 X |
| 5,226,613 | 6/1993 | Kataoka | 242/72.1 X |

FOREIGN PATENT DOCUMENTS

4200370 7/1992 Germany .................... 156/73.1

*Primary Examiner*—David A. Simmons
*Assistant Examiner*—Charles Rainwater
*Attorney, Agent, or Firm*—Sughrue, Mion, Zinn, Macpeak & Seas

[57] ABSTRACT

A photographic film cassette has a spool on which photographic film is wound, and a cassette shell for containing the spool rotatably. A photographic film passageway is formed in the cassette shell. The photographic film is passed out of and into a roll chamber through the passage. A pair of light-shielding members are attached to inside surfaces of the passageway for preventing ambient light from entering the cassette shell, and are provided respectively with innermost, midway and outermost portions, as viewed in the direction of advancement of the photographic film out of the film chamber. The respective innermost and outermost portions are spaced apart one from another. The respective midway portions are in contact one with another when a leader of the photographic film is entirely contained in the chamber. In a process for manufacturing the cassette, a horn of an ultrasonic welding device is applied to the light-shielding members, to weld them to cassette halves ultrasonically. In welding, pressure of the welding horn is varied between the midway portions and the innermost and outermost portions. The light-shielding members are thus compressed with heat for reducing the thickness thereof.

3 Claims, 14 Drawing Sheets

PHOTOGRAPHIC FILM CASSETTE AND METHOD OF MANUFACTURING THE SAME

BACKGROUND OF THE INVENTION

1. Field of the Invention

The present invention relates to a photographic film cassette and a method of manufacturing the same. More particularly, the present invention relates to an improvement of a photographic film cassette in which a leader of a photographic film is caused, by rotation of a spool, to advance to the outside of a cassette shell, and a method of manufacturing the cassette.

2. Description of the Related Art

As suggested in U.S. Pat. No. 4,834,305, a known photographic film cassette includes a photographic film positioned so that a leader does not protrude from the cassette prior to loading the cassette in a camera. Such a cassette is easily loaded into a camera. A simple film-advancing mechanism of the camera is typically used with this type of cassette, and includes a construction which rotates a spool to unwind a photographic film strip (hereinafter referred to as film), thereby causing the leader to move through a passageway for the photographic film and exit from the cassette.

The passageway is a slot defined between a pair of gapped portions formed on a pair of cassette halves. Light-shielding members are attached to the inside of the gapped portions in order to prevent ambient light from entering the cassette shell. The light-shielding member are, for example, a fabric of high resilience, such as plush or teremp cloth. If the cassette shell is made of resin, the light-shielding members can be welded to the passageway by ultrasonic welding, wherein an ultrasonic wave is applied for melting the resin, and the light-shielding members are pressed against the melted portions. Such a method is convenient and advantageous in that no adhesive agent is required.

It is important to minimize frictional forces between the light-shielding members and the photographic film 4 in order to minimize the torque required for outward advancement of the leader. Various manners of attaching the light-shielding members to the passageway have been proposed. For example, in a commonly assigned copending application U.S. Ser. No. 07/897,058. As illustrated in FIG. 20, light-shielding members 107 and 108 are welded to passage surfaces 101 and 102 of a pair of gapped portions 109a and 109b interior from a passage mouth 6 by an ultrasonic welding device. Innermost portions 103 and 104 of the light-shielding members 107 and 108 are welded by a welding horn of the welding tool, and are spaced so as to be kept from contact with photographic film 4. Innermost attaching portions 101a and 102a of passage surfaces 101 and 102 are such that advancement of the photographic film 4 does not come into contact with innermost portions 103 and 104.

To keep the light-shielding members 107 and 108 nearly free from creases and irregularities and improve light-shielding performance, light-shielding members 107 and 108 consist of fabrics 107a and 108a which are 0.1 mm thick, and respective soft polyurethane sponges 107b and 108b which are 3.1 mm thick as measured under the application of a load of 5 g/cm². Facing surfaces of the fabrics 107a and 108a have frictional coefficients of 0.25 or less with respect to the photographic film 4. Their compressibility is such that a different R, between $T_1$ and $T_2$, satisfies the condition $0.6$ mm $< R < 4.0$ mm, wherein the light-shielding members are $T_1$ thick under a load of 100 g/cm², and be $T_2$ thick under a load of 20 g/cm. A polyester thread of 70 denier consisting of 20 filaments is woven to be a fabric of plain weave, in which a warp thread density is 90 threads/inch and a weft thread density is 120 threads/inch. The fabric of the plain weave is dyed by a black dispersed dye of 5% on the weight of fiber (o.w.f.), and then subjected to antistatic treatment by Parmalose TM (trade name; manufactured by ICI Ltd.) of 4% o.w.f.

Should a considerable area of a light-shielding member be welded by ultrasonic welding, resilience of the member would be lowered. The construction disclosed in the above document has the purpose of maintaining the initial resilience even after welding, by limiting welding to the innermost portions on the slanted surfaces 101a and 102a.

However, there is a problem in the above-mentioned construction in that the frictional forces between the photographic film 4 and the light-shielding members 107 and 108 are too high when the photographic film 4 is withdrawn or rewound up into the cassette shell. Except for the innermost portions, the light-shielding members 107 and 108 are unattached from the passageway and thus come into contact with the photographic film 4 over a relatively large area when it is rewound, and are therefore highly resistant to movement of the film, as illustrated in FIG. 21 (where gaps between the light-shielding members 107 and 108 are the attaching portions 101 and 102 are exaggerated for convenience in understanding). The load on the spool of the cassette is thus enlarged, and a motor in a camera may operate poorly or be damaged. Even after rewinding up the photographic film 4 in such a device, the light-shielding performance can be degraded and the leader can fail advance even, when the spool is rotated in the unwinding direction, because of the deformation of light shielding members 107 and 107 as indicated in FIG. 21.

If the ultrasonic welding device is applied to the entire surfaces of the light-shielding members 107 and 108, the light-shielding members 107 and 108 may be melted and their resilience lowered.

SUMMARY OF THE INVENTION

In view of the foregoing problems, an object of the present invention is to provide a photographic film cassette in which the resistance, due to light-shielding members, of movement of the photographic film is minimized, and a method of manufacturing such a cassette.

Another object of the present invention is to provide a photographic film cassette in which light-shielding members are reliably attached to the cassette shell and a method of manufacturing such a cassette.

In order to achieve the above and other objects and advantages of this invention, a thin photographic film passageway is formed in the cassette shell for allowing the photographic film to pass out of and into the chamber. A pair of light-shielding members are attached to the passage surfaces, in opposition to one another, for preventing ambient light from entering the cassette shell through the passageway. The light-shielding members are provided respectively with innermost, midway and outermost portions as viewed relative to a direction of advancement of the photographic film. The light-shielding members are spaced apart one from another at the innermost and outermost portions, and the midway portions thereof are in contact one with another when a leader of the photographic film is entirely contained in the chamber.

In a method of manufacturing the same photographic film cassette, the light-shielding members are respectively placed on the gapped portions of the respective cassette halves. A horn of an ultrasonic welding device is applied to the light-shielding members, thereby to weld the light-shielding members to the gapped portions. The pressure of the welding horn on the light-shielding members is varied between the midway portions, the innermost and the outermost portions so as to shrink the light-shielding members with heat and reduce a thickness thereof at the innermost and outermost portions.

In a preferred embodiment, the welding device includes a plurality of horns which are applied to four corners of the light-shielding members. The light-shielding members are held immovably on the gapped portions with a holding jig, while applying the ultrasonic welding device.

The friction between the photographic film and the light-shielding members is sufficiently reduced, even when the photographic film is rewound up into the cassette shell. Accordingly, the torque required by a motor in a camera is minimized and a reliable, compact camera can be constructed. Also, the light-shielding performance is maintained, and the leader is not prevented from advancing when the spool is rotated.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
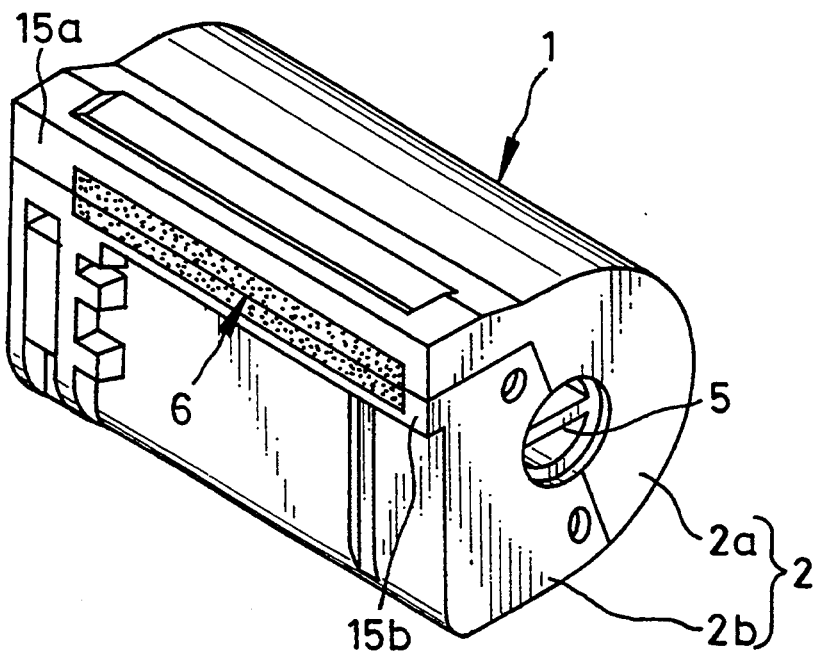
FIG. 1 is a perspective view illustrating an overall configuration of a photographic film cassette of the preferred embodiments.
Figure 2:
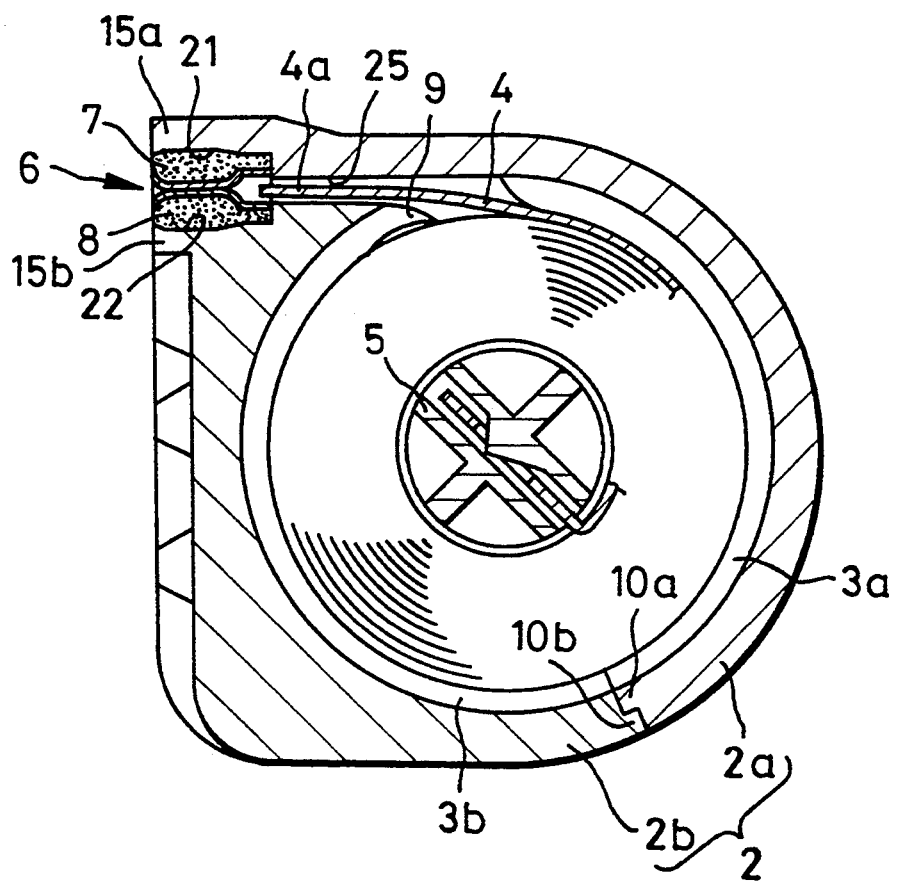
FIG. 2 is a cross section illustrating the cassette of FIG. 1.

In FIGS. 1 and 2 illustrating a novel photographic film cassette 1 according to a preferred embodiment of the invention. A cassette shell 2 is a constituted of a pair of cassette halves 2a and 2b formed of plastics, e.g., polystyrene resin, having light shielding characteristics. A photographic film strip 4 is wound on a spool 5 and contained in the cassette shell 2. Stepped edges 10a and 10b are formed on the cassette halves 2a and 2b, fitted together for preventing ambient light from entering the cassette shell 2 between the cassette halves 2a and 2b.

Respective gapped portions 15a and 15b, having the shape of a channel, are formed on the cassette halves 2a and 2b so as to define a thin slot-like passageway 25 through which the photographic film 4 can pass. The passageway 25 communicates to a passage mouth 6 through which the photographic film 4 exits from the cassette shell 2. Light-shielding members 7 and 8 (known as plush in the field of photography) are welded on upper and lower attaching portions 21 and 22 of the passageway 25, so as to prevent ambient light from entering through the passage mouth 6.

The cassette shell 2 has a roll chamber, inside which there is formed a pair of arcuate ridges 3a and 3b which are in contact with the outermost turn of the roll of the photographic film 4 to prevent it from loosening. A leader 4a of the photographic film 4 thus rotates along with rotation of spool 5. A separator claw 9, which abuts on the leader 4a as rotated so as to separate it from the roll of the photographic film 4, is formed on the end of the ridge 3b. Further rotation of the spool 5 causes the leader 4a to advance along the passageway 25 to exit outward from the cassette shell 2.

Figure 3:
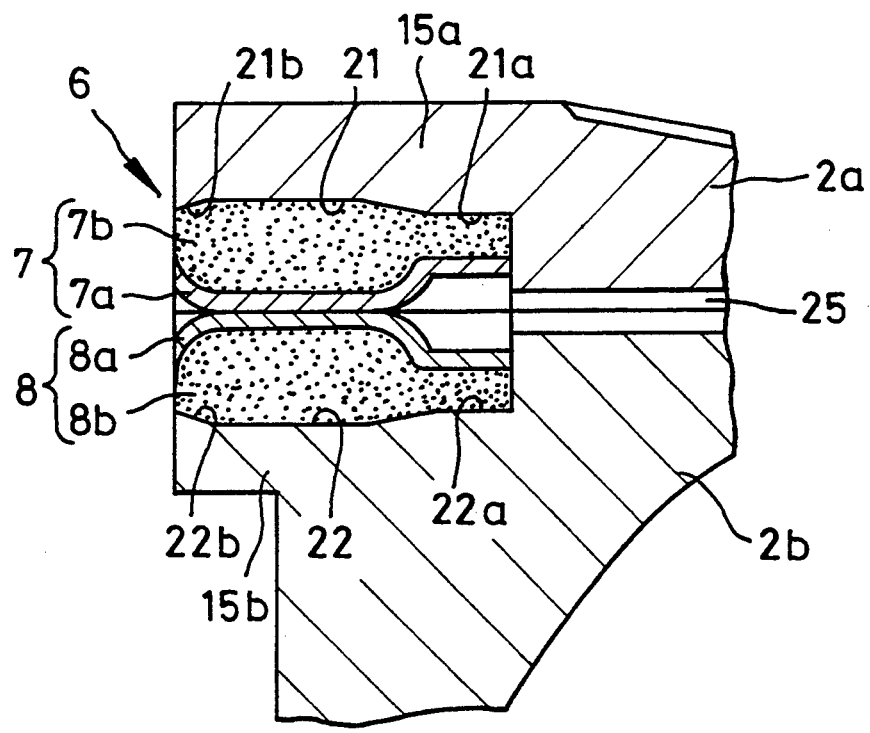
FIG. 3 is a cross section in enlargement, partly illustrating a passageway of the cassette of FIG. 1.
Figure 4:
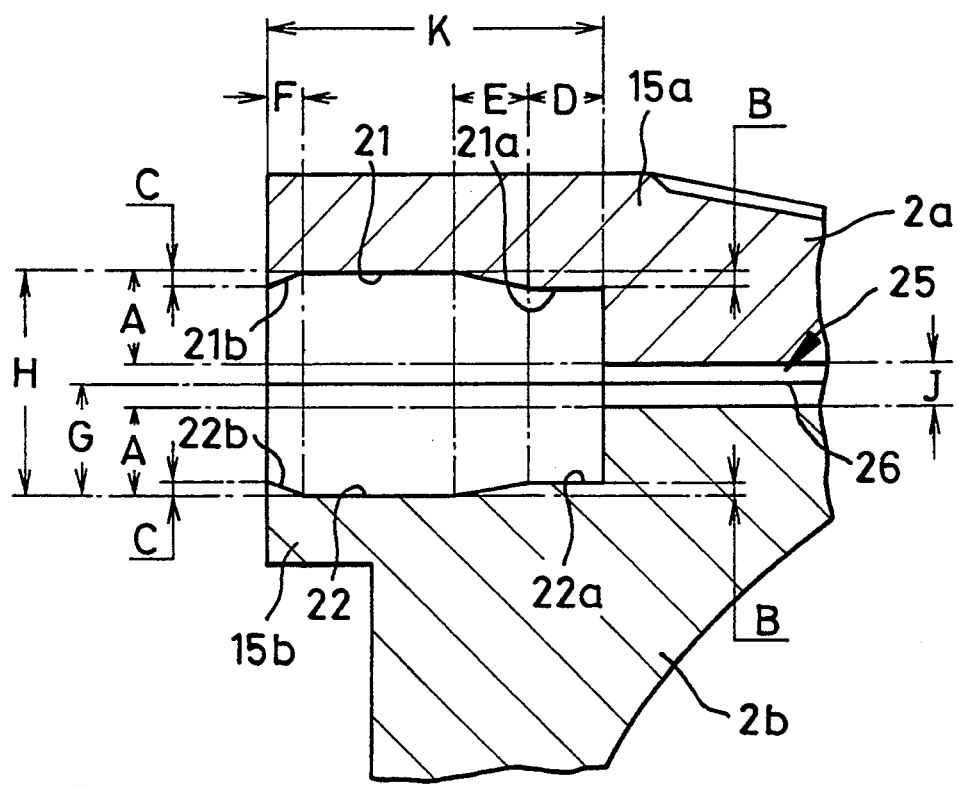
FIG. 4 is a cross section illustrating the passageway of FIG. 3 in detail.

As illustrated in FIGS. 3 and 4 in detail, the light-shielding members 7 and 8 are attached to the attaching portions 21 and 22 in such a manner that, as viewed in the direction of advancing the photographic film 4, respective innermost and outermost portions thereof are in a spaced apart relation. The passage surfaces inside the passageway 25 are symmetrical with respect to a center line 26, preferably having a width J, of the passageway 25, where J=0.6 mm. Letting H be the interval between the attaching portions 21 and 22, and K be the length thereof preferably, H=3 mm and K=4.5 mm. To attach the light-shielding members 7 and 8 to the attaching portions 21 and 22, an ultrasonic welding tool, or the like, is used. The attaching portions 21 and 22 are provided with projections 21a, 21b, 22a and 22b in the respective innermost and outermost positions thereof for adaptation to welding.

The light-shielding members 7 and 8 consists of fabrics 7a and 8a which are preferably 0.1 mm thick, and respective soft polyurethane sponges 7b and 8b which are preferably 4.5 mm thick as measured under the application of a load of 5 g/cm². A polyester thread of 70 deniers consisting of 20 filaments is woven to be a fabric of plain weave, in which a warp thread density is 90 threads/inch and a weft thread density is 120 threads/inch. The fabric of the plain weave is dyed by a black dispersed dye of 5% on the weight of fiber (o.w.f.), and thereafter subjected to antistatic treatment by Parmalose TM (trade name; manufactured by ICI Ltd.) of 4% o.w.f. The apparent density of the sponges 7b and 8b is 60 kg/m³ according to Japanese Industrial Standards (JIS) K6401. The fabrics 7a and 8a as facing layers are attached to the sponges 7b and 8b as base layers, by means of flame-laminating, in which the surfaces of the sponges 7b and 8b are melted by flame and the fabrics 7a and 8a are pressed thereon. Respective 0.6 mm of the sponges 7b and 8b is so melted that the light-shielding members 7 and 8 become 4.0 mm thick after melting. The above-mentioned fabric is just an example of various fabrics which can be utilized in the invention.

Figure 7:
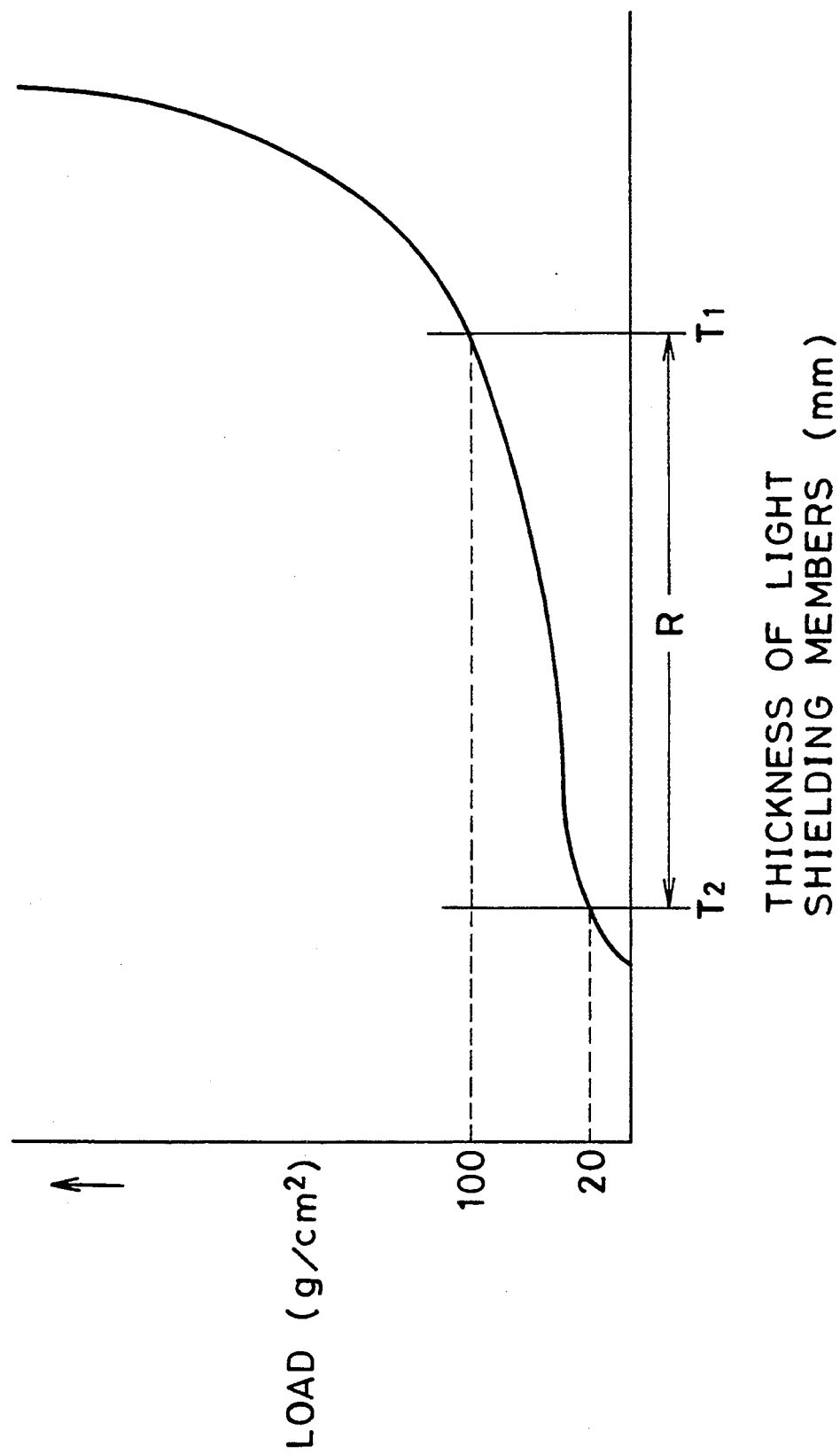
FIG. 7 is a graph illustrating the compressibility of the light-shielding member.

When a load of 100 g/cm² is applied to each of the eight-shielding members 7 and 8, the thickness $T_1$ of the light-shielding members is 1.5 mm. When a load of 20 g/cm² is applied, the thickness $T_2$ thereof is 3.8 mm. The difference R between the thicknesses $T_1$ and $T_2$ is 2.3 mm. Of course, the compressible characteristic of the light-shielding members 7 and 8 is such that the thickness decreases as the pressure increases (see FIG. 7). Should the difference R be 0.6 mm or less, the photographic film 4 may become fogged due to temporary slight reduction in thickness of the light-shielding members 7 and 8, and may fail to be reliably advanced out of the cassette shell 2 because a larger advancing torque would be required due to necessity of the larger pressing force of the light-shielding members 7 and 8. Should the difference R be 4.0 mm or more, the restoring force of the light-shielding members 7 and 8 against deformation would become strong. Creases and irregularities may be formed in the light-shielding members 7 and 8 and fogging of the photographic film 4 may result. The coefficient of friction of the facing surface of the fabrics 7a and 8a is 0.20 as against the back surface of the photographic film 4, and is 0.15 as against the emulsion surface of the photographic film 4, when FUJI COLOR SUPER HG 400 (trade name; manufactured by Fuji Photo Film Co., Ltd.) is used as the photographic film 4.

When a horn 27 (see FIG. 5) of an ultrasonic welding tool is applied to weld the light-shielding members 7, 8, thickness of the light-shielding members 7, 8 is reduced in the innermost portions and the outermost portions as viewed along the advancing direction of the photographic film 4 through the passageway 25. The thickness of the light-shielding members 7 and 8 after being welded to the attaching portions 21 and 22 is correlated with a clearance CL related to the welding horn which is illustrated in FIG. 8.

The "clearance" (CL) herein of the horn is defined as a minimal interval between a welding surface of the cassette half and a pressing surface 28 (see FIG. 5) of the horn as held during oscillation of the horn, while the light-shielding member is welded to the cassette half by an ultrasonic wave applied to the welding surfaces of the light-shielding member and the cassette halves 2a and 2b, when the horn applies the ultrasonic wave from the side of the light-shielding member. Note that, when the clearance is smaller, more heat is generated and the light-shielding member is compressed and melted. Porosity of the light-shielding member is thus reduced, so as to make it less resilient after welding.

When the horn is shifted down to come in contact with the surface of the light-shielding member, and presses it closer to the cassette half, it is detected that a predetermined pressure is applied to the horn. Upon this detection, oscillation is started. By predetermining the above-mentioned clearance, the horn is controlled to be maintained at a position which is not closer to the cassette half than the predetermined clearance, as will be described below. Thus, no matter how much energy is applied to the horn, the thickness of the light-shielding member will never be reduced to less than the predetermined clearance. It is known from the graph that, as the clearance decreases, thickness of the light-shielding members 7 and 8, as welded, decreases.

Figure 8:
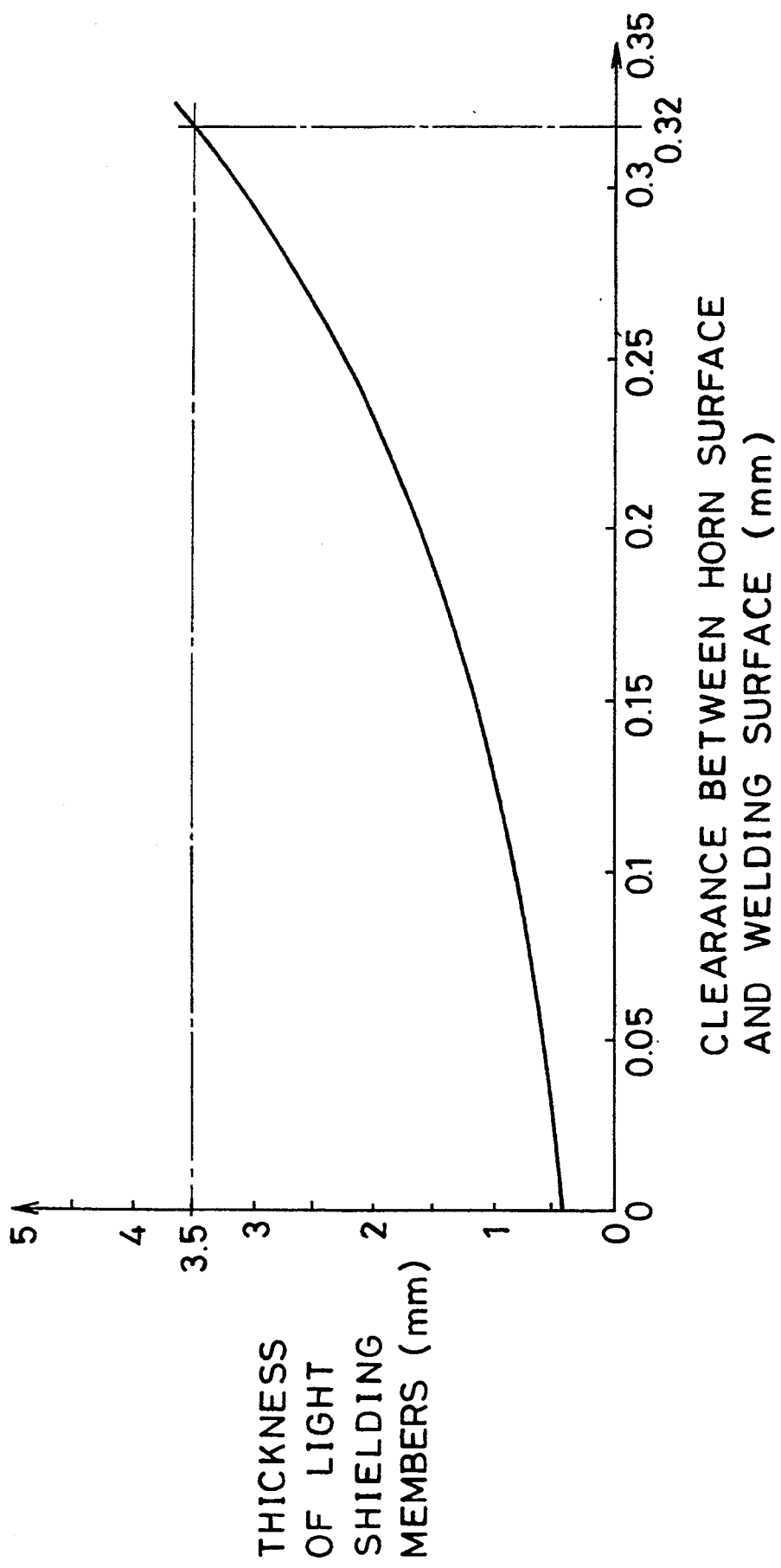
FIG. 8 is a graph illustrating a relationship between a process and a result of welding the light-shielding member.

The graph of FIG. 8 was obtained from measurement of the light-shielding members 7, 8 as cut to a size of 38.1 mm long, 5.5 mm wide and 4.0 mm thick and welded to a lubricant plate of polystyrene resin 119 mm long, 50 mm wide and 2 mm thick. The light-shielding members were welded by an ultrasonic welding device Model 947M (trade name) manufactured by BRANSON Ultrasonics, and by setting the apparatus in the energy mode and supplying energy of 110 Joules. The thickness was measured with a digital micrometer named LITEMATIC 14 g/cm³ (trade name) manufactured by Mitutoyo Co.

Note that the "energy mode" of the ultrasonic welding tool is defined to be a mode in which the welding horn is automatically stopped from oscillating when ultrasonic energy of a predetermined amount (e.g., 110 Joules) has been developed by oscillation of the horn. When increased energy as applied, more heat is generated and the light-shielding member is compressed and melted to a greater extent. Porosity of the light-shielding member is thus reduced, so as to make it less resilient after welding. In the energy mode, the predetermined energy has priority over the predetermined clearance, so that the oscillation may stop before reaching the predetermined clearance ($CL_{EF}$) ($CL_{PR}$). Thus, an effective clearance corresponding to a position where the horn is actually held, possibly can be larger than the predetermined clearance ($CL_{PR}$).

In consideration of these characteristics, the light-shielding members 7 and 8 desirably are arranged in the passageway 25 and resiliently compressed together between the upper and lower attaching portions 21 and 22, at a compressing factor Z from 50% to 65% inclusive. The clearance related to the welding is predetermined in correspondence with the desired compressing factor Z, so as to properly weld the light-shielding members 7 and 8 so as to be low in resistance against movement of the photographic film, and high in shielding light performance.

The clearance $CL_{MD}$ at the midway portion as viewed with respect to the light-shielding members 7 and 8 in the photographic film advancing direction is, for example, 0.32 mm. The clearance $CL_{IN}$ of the innermost portions, as viewed in the photographic film advancing direction, is set smaller than the midway clearance $CL_{MD}$.

Suppose the welding tool were not set in the energy mode, and carried out ultrasonic welding by applying constant pressure to the light-shielding members 7 and 8. Let the clearance $CL_{PR}$ be predetermined at 0 mm at the projections 21a and 22a with respect to the pressing surface of the horn, which would be pressed on the light-shielding members 7 and 8 and supply ultrasonic energy for an unlimited period. Then the light-shielding members 7 and 8 would be thoroughly melted so as to be essentially absorbed in the attaching portions 21 and 22, so that the horn would come in contact with the projections 21a and 22a.

In practice, however, when the supplied energy is limited to 110 Joules in pressing the horn with the predetermined clearance $CL_{PR}$ set at 0 mm under pressure of 5 kg/cm$^2$, then the horn is kept from coming into contact with the projections 21a and 22a. The minimal thickness Tm of the light-shielding members 7 and 8 become TM>0. There is a problem in setting the clearance $CL_{PR}=0$ in that the sponge of the light-shielding members may lose nearly all resilience after welding. In limiting the energy to 110 Joules in the energy mode, the clearance $CL_{PR}$ is changed, e.g., to 0.13–0.32 mm, so that the sponge is prevented from completely melting, and is so welded that one base part is melted and compressed and the other opposite part is kept resilient. Accordingly, 110 Joules, for example, of energy is a value suitable for properly balancing the welding process.

As illustrated in FIG. 4, a height C of the projections 21b and 22b referring to the attaching portions 21 and 22 desirably meets the condition $0<C\leq B$, so that the light-shielding members attached thereon is not detached by moving along with film, as it is rewound into the cassette shell, due to a high pressure engagement with the film.

Figure 5:
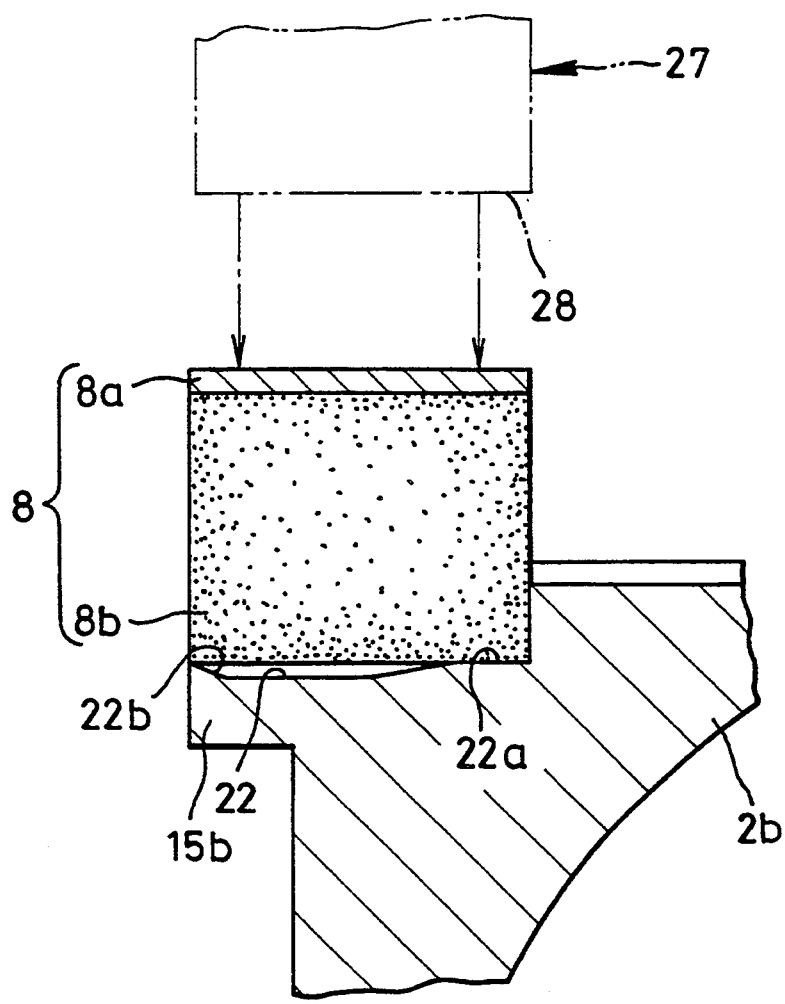
FIG. 5 is an explanatory view illustrating a step of welding a light-shielding member to the passageway.
Figure 6:
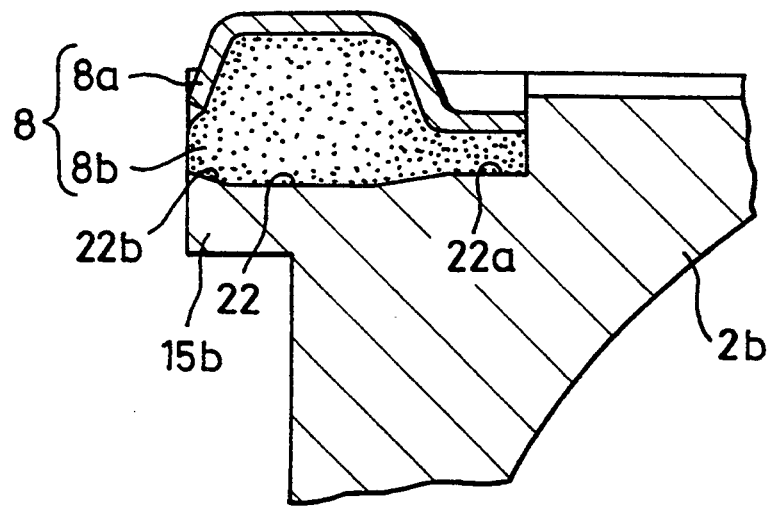
FIG. 6 is an explanatory view illustrating the light-shielding member as welded.

The process of manufacturing the novel cassette of the first embodiment is described below. As illustrated in FIG. 5, the horn 27 has a flat pressing surface 28. The innermost and outermost portions of the light-shielding member 8 are affected to a greater extent by the ultrasonic energy, as they are compressed between the projections 22a, 22b and the pressing surface 28. On the other hand, the midway portion of the light-shielding member 8 is only slightly melted, comparatively. After welding, the innermost and outermost portions have a height which is smaller than the midway portions, as illustrated in FIG. 6. The light-shielding member 7 is welded to the attaching portion 21 in a similar manner. When the cassette halves 2a and 2b are assembled together, the light-shielding members 7 and 8 are pressed against one another and held in resilient compression.

It is to be noted that, to determine the value of the midway clearance $CL_{MD}$, the graph of FIG. 8 is referred to in correspondence with the thickness after welding, as calculated from the following equations:

$$Z=\{L1-(G-L2)\}/L1\times 100 \quad T-L1+L2$$

where Z is the compressing factor as described above, L2 is a thickness of the fabrics 7a and 8a after welding, G is a distance between the center line 26 and either attaching portion 21, 22 (G=1 mm), L1 is a thickness of the light-shielding members 7 and 8 as welded. Predetermining Z to be 59%, letting L2 be 0.1 mm and unchanged irrespective of welding, then L1 is 3.4 mm and T is thus 3.5 mm. The graph of FIG. 8 is referred to from the thickness 3.5 mm, to determine that the midway clearance $CL_{MD}$, should be 0.32 mm.

Referring to precise sizes of the cassette of the first preferred embodiment, a retracting amount A of the attaching portions 21 and 22, as viewed from the inside of the passageway 25, is 1.2 mm for example. Then, the height B is in the range of:

$$0.13<B<1.1,$$

preferably $$0.15<B<1.0 \text{ (in mm)}.$$

The light-shielding members 7 and 8 have the minimal thickness Tm as welded at the innermost portions on the projections 21a and 22a. It is preferable for Tm to satisfy the following relationship:

$$B<A-Tm$$

for the purpose of reducing resistance against the photographic film 4 when it passes through the passageway 25.

Let D be the length of a flat surface of the innermost projections 21a and 22a. Let E be the range of a slope of the projections 21a and 22a. Let F be the range of the outermost projections 21b and 22b. The sizes D, E and F are in the ranges of:

$$0.2<D<1.5,$$

$$0.5<E<1.2, \text{ and}$$

$$0.2<F<1.0;$$

preferably in the ranges of:

$$0.3<D<1.2,$$

$$0.8<E<1.1, \text{ and}$$

$$0.3<F<0.8 \text{ (in mm)}.$$

Figure 9:
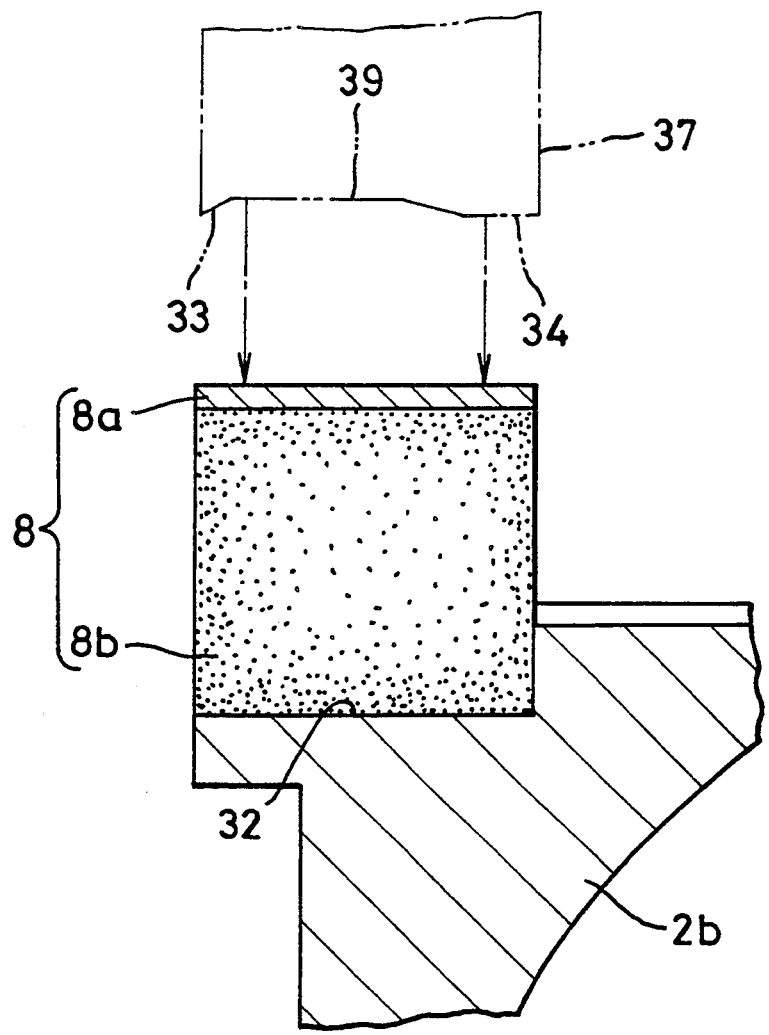
FIG. 9 is an explanatory view illustrating a step of welding the light-shielding member to a passageway of a second embodiment.
Figure 10:
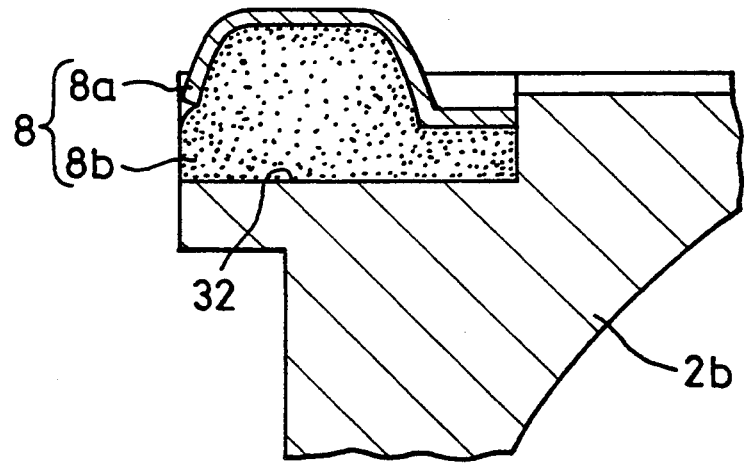
FIG. 10 is an explanatory view illustrating the light-shielding member of the second embodiment as welded.
Figure 11:
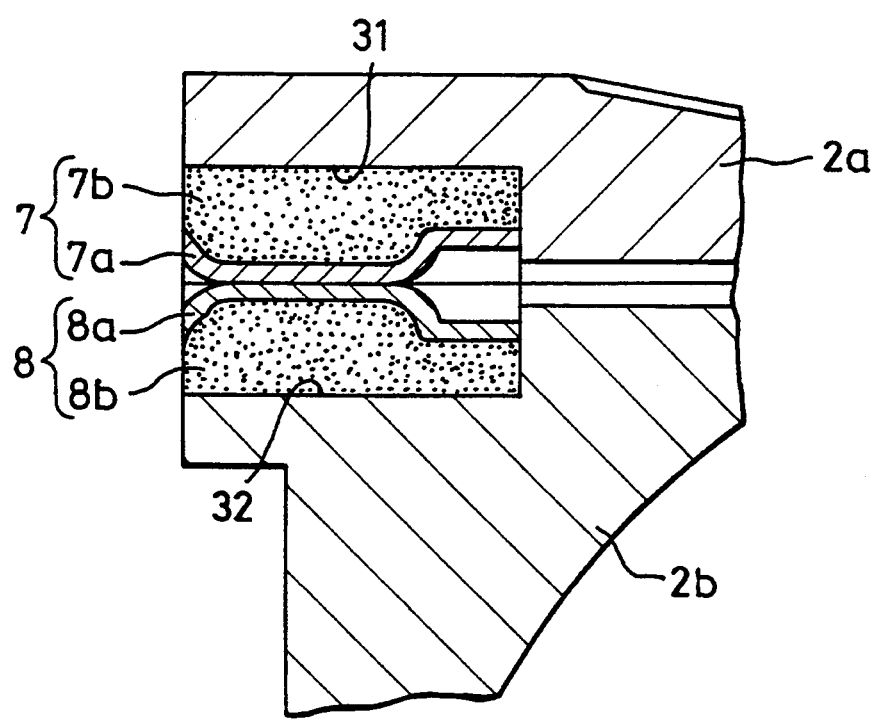
FIG. 11 is a cross section partly illustrating the passageway of the second embodiment.

A second embodiment of the invention will now be described with reference to FIGS. 9–11. An ultrasonic welding horn 37 has a pressing surface 39, which is provided with projected portions 33 and 34. Attaching portions 31 and 32 inside a passageway are formed to be flat, so that the clearance of the horn 37 with respect to the attaching portions 31 and 32 is small in the innermost and outermost portions as viewed along the advancing direction of the photographic film 4 (See FIG. 11). The detailed sizes of the projected portions 33 and 34 are similar to those of the projections 22a and 22b of the first embodiment.

In a third embodiment, the light-shielding members 7 and 8 are, previously, provided with double-sided adhesive tape on the base surfaces on the sponges 7b, 8b, and are heated by an electric iron so as to be melted and compressed at the innermost and outermost portions of the light-shielding members 7 and 8. The light-shielding members 7 and 8 are then attached to the attaching portions 33 and 34 in a state where the innermost and outermost portions of the light-shielding members 7, 8 are spaced one from another to a relatively large degree. NP305B (trade name) manufactured by Sony Chemical Co., Ltd. can be used as the double-sided tape.

Experiments with respect to the first to third embodiments and a conventional photographic film cassette. To measure the leader advancing rate, the leader of the photographic film was advanced 30 times out of the cassette shell, and if the number of successful exits of the leader from the passage mouth was n, the leader advancing rate was calculated as (n/30)×100. To measure the leader rewinding rate, the leader of the photographic film was rewound 30 times up into the cassette shell, and if the number of successful withdrawals of the leader into the passage mouth was n, the leader rewinding rate was calculated as (n/30)×100. Rotational torque applied to the spool 5 for these measurements was 200 g·cm. To measure light-shielding performance, two methods were utilized. In the first method, the leader was pulled out of the cassette shell, the cassette was illuminated under a light of 70,000 lux for 3 minutes. The photographic film was inspected for fogging after development. Secondly, the cassette was illuminated under a light of 70,000 lux for 3 minutes with the leader fully contained in the cassette shell. The photographic film was once again inspected for fogging after development. Results of the tests are shown below:

TABLE 1

|  | Leader Advancing Rate | Leader Withdrawing Rate | Light-Shielding Performance |
| --- | --- | --- | --- |
| Example 1 | 100 | 100 | o |
| Example 2 | 100 | 100 | o |
| Example 3 | 100 | 100 | o |
| Prior Art | 100 | 67 | X |

As is apparent from Table 1, advancement and rewinding of the leader of the photographic film 4 in the cassettes according to the preferred embodiments was very reliable and consistent while good light-shielding performance of the light-shielding members 7 and 8 was obtained (no fogging is indicated by "o".

In the first and second embodiments, the ultrasonic welding horn is pressed against the light-shielding members one time for welding the light-shielding members to the attaching portions. Alternatively, an ultrasonic welding horn may be pressed stepwise two or more times for welding, i.e., on the inner and outer halves of the light-shielding members. In the third embodiment, the double-sided adhesive tape in Example 3 may be replaced with various other adhesive or bonding materials, such as an instantaneous adhesive agent, an induction bonding agent, a hot-melt adhesive agent, a hot-melt pressure-sensitive adhesive agent, a hot-track adhesive agent, or the like. An adhesive agent may be applied to the whole surface of the light-shielding members or only to their innermost and outermost portions.

The ultrasonic welding horns as mentioned above, however, are difficult to position exactly. Accordingly, the welding horn may contact a light-shielding member to displace it inappropriately. The innermost and outermost portions of the light-shielding members cannot be suitably welded in such a situation. Therefore, the light-shielding members might become detached from the cassette shell by the advancement or withdrawal of the photographic film, due to an inadequate welding of the light-shielding members.

Figure 12:
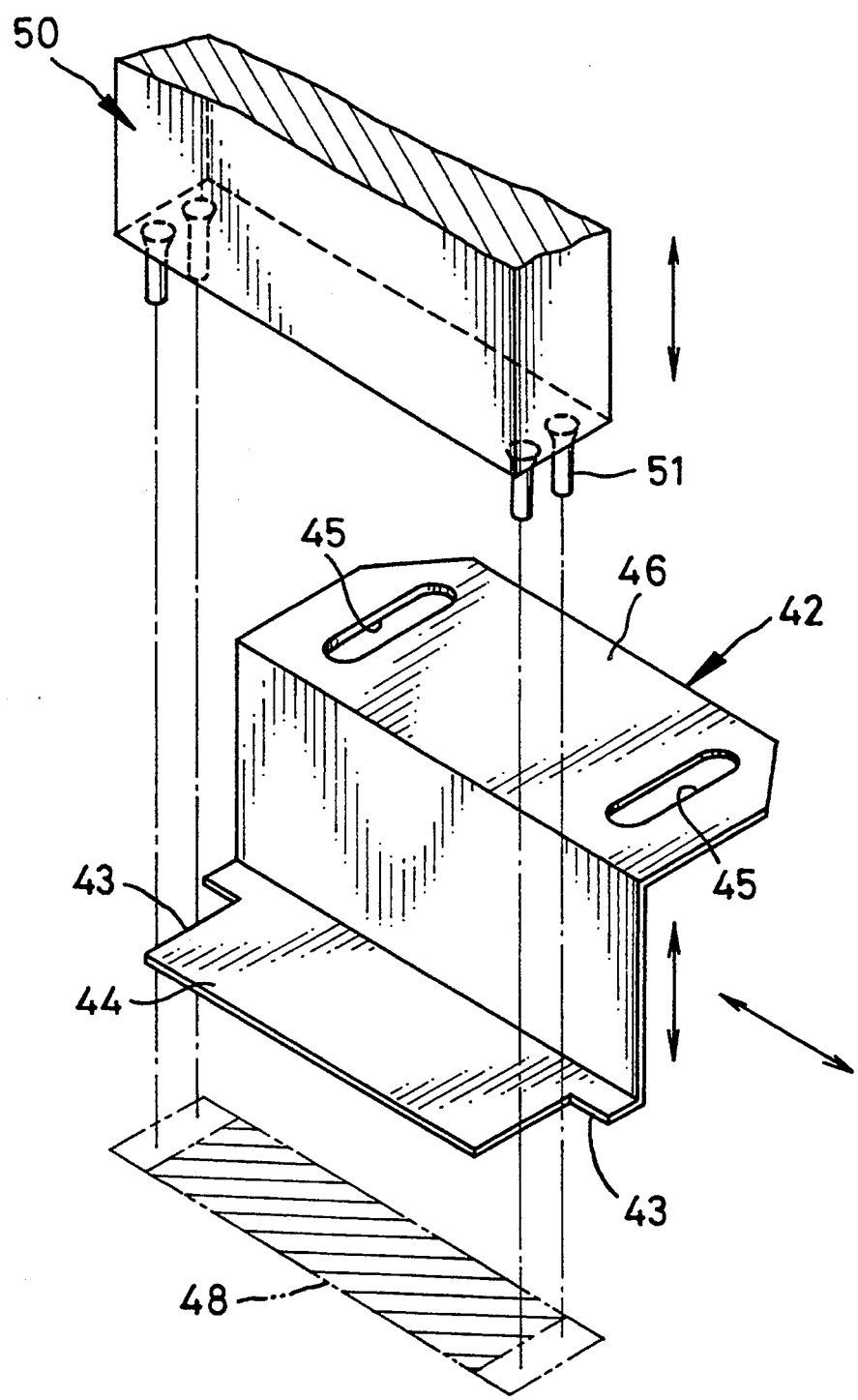
FIG. 12 is an explanatory view in perspective, illustrating an ultrasonic welding tool, a plush holding jig and a light-shielding member in combination according to a fourth embodiment.
Figure 13:
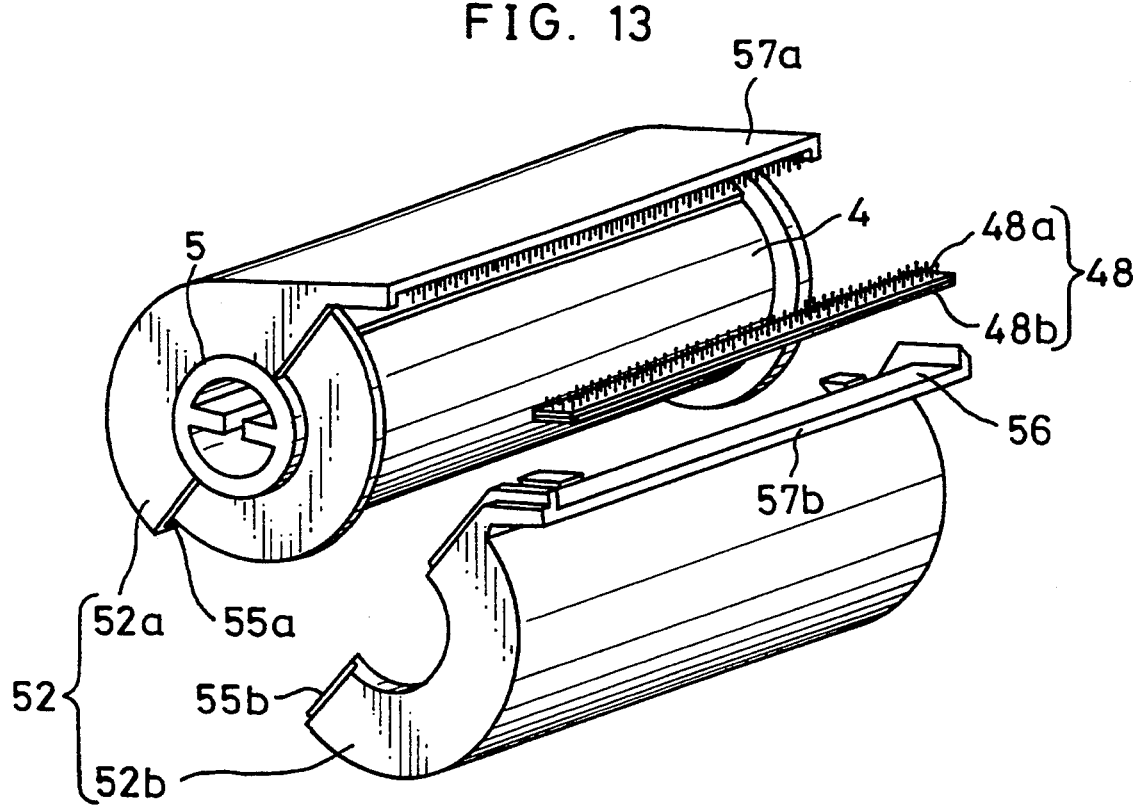
FIG. 13 is an exploded perspective view illustrating a cassette to be treated with the method of the invention.
Figure 14:
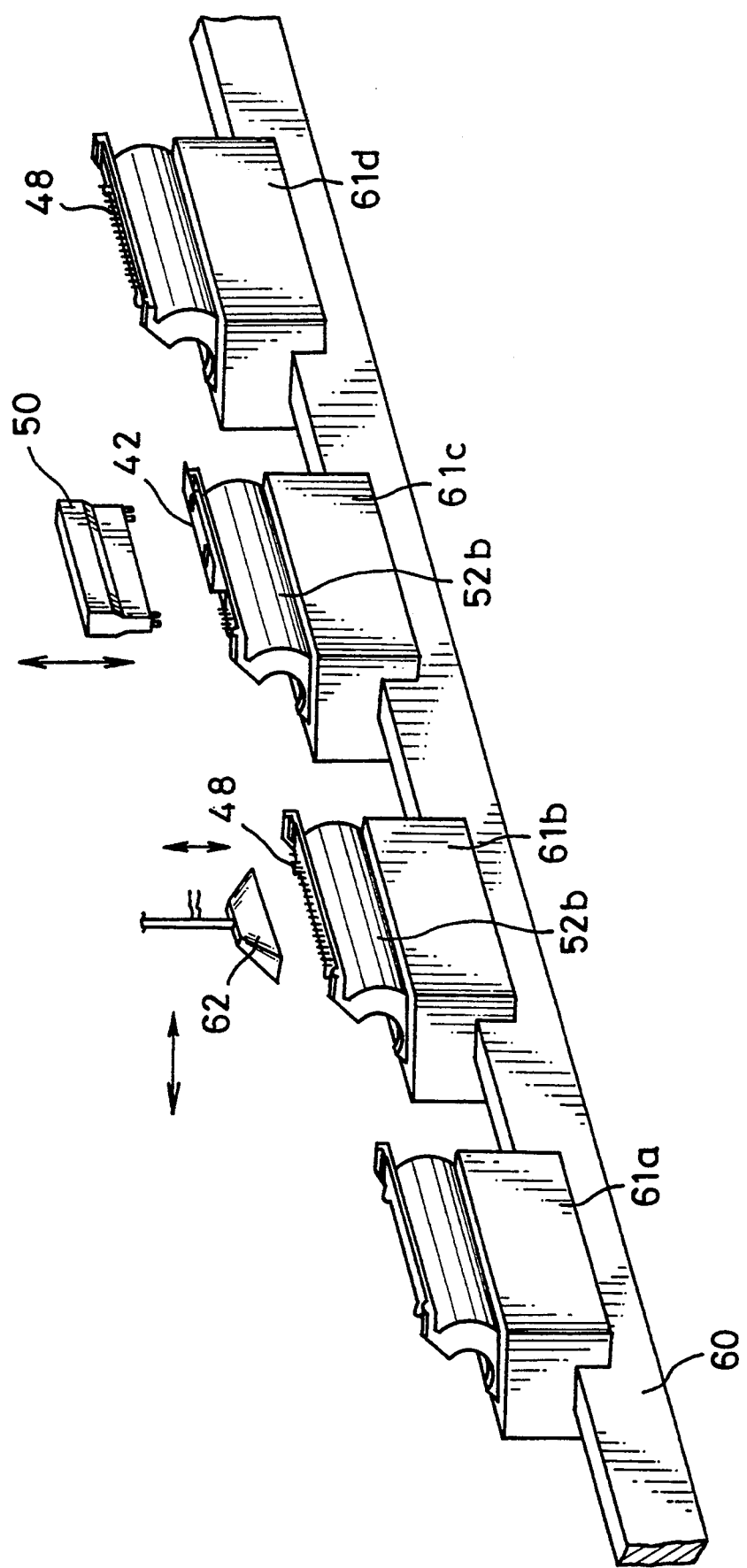
FIG. 14 is an explanatory view illustrating a novel process of manufacturing the cassette.

FIGS. 12 to 14 illustrate a fourth preferred embodiment for solving this problem. Elements similar to those of the above embodiment are designated with the same reference numerals. A plush holding jig 42 is constituted of a holding plate 44 and an attaching tongue 46. A pair of recess 43 are formed in the holding plate 44. A pair of elongated holes 45 are formed in the attaching torque 46. The holding jig 42 is attached via the holes 45 to a shifting mechanism (not shown), so as to be movable along the arrows indicated in FIG. 12. When the holding jig 42 is shifted down to a light-shielding member 48, the holding plate 44 is pressed against it in the portion indicated with the hatching, so as to hold the light-shielding member 48 immovably on to the attaching portion in the passageway.

The underside of an ultrasonic welding tool 50 is rectangular, and is provided with welding horns 51 on the four corners of the underside. The welding tool 50 is adapted to being shifted up and down by a shifting mechanism (not shown). When the welding tool 50 is shifted down, the horns 51 are pressed against the four corners of the light-shielding member 48 outside the holding plate 44. In welding the four corners with ultrasonic energy, the attaching portion of the cassette half is melted in correspondence with the horns 51. When the melted portions are cooled, the light-shielding member 48 is fixed to the attaching portion.

A cassette manufactured by the steps above is illustrated in FIG. 13 and has a cassette shell 52 constituted of a pair of cassette halves 52a and 52b. Reference numerals 55a and 55b designate stepped edges. A reference numeral 56 designates a passage mouth defined between a pair of gapped tongues 57a and 57b.

The light-shielding member 48 consists of a pile fabric woven in a needle loom, and is constituted of a base fabric 48b and pile threads 48a woven in the former in the V-shape. The pile threads 48a are of nylon of 100 denier and 48 filaments. The base fabric 48b is woven in the plain weave, from warp threads of nylon of 50 deniers and 30 filaments, and weft threads of nylon of 70 denier and 24 filaments. The fabric of the plain weave is dyed in black with a Mitsui Nylon Black SGL (trade name) at 6% o.w.f., thereafter dryed and subjected to sealing up with emulsion having main components of styrene-acrylic resin and styrene-butadiene resin, so as to prevent the pile threads 48a from dropping off from the base fabric 48b. Also, other fabrics may be used.

Referring to FIG. 14 illustrating steps of attaching a light-shielding member to a cassette half, there is arranged a rail 60 along which a number of supporters 61a to 61d are disposed at a regular interval for supporting the cassette half 52b. The supporters 61a to 61d are intermittently conveyed along the rail 60. The supporter 61b holds the cassette half 52b, corresponding to which an arm 62 is disposed for supplying the cassette half 52b with the light-shielding member 48. The cassette half 52b, after an upward retraction of the arm 62 from the rail 60, receives the plush holding jig 42 as it is shifted downward. The light-shielding member 48 is thus held, by holding the jig 42, on the cassette half 52b.

The cassette half 52b, as held in the supporter 61c, is maintained under the pressure of the holding jig 42. The ultrasonic welding tool 50 is disposed in correspondence with the supporter 61c in a vertically shiftable manner. When the supporter 61c is stopped, the welding tool 50 is shifted down to press the horns 51 on to the light-shielding member 48 for ultrasonic welding. The light-shielding member 48 is thus sandwiched between the holding jig 42 and the cassette half 52b so that the welding tool 50 can weld the light-shielding member 38 in the exact position desired.

The welding tool 50 and next the holding jig 42 are shifted up, after which the support 61c is moved, with the cassette half 52b, downstream toward the supporter 61d. Though the hatched portion of the light-shielding member 48 has been pressed by the holding plate 44, there is an adverse effect on the recoverability of the pile threads 48a, because the hatched portion is not supplied with heat generated by the ultrasonic energy during welding. In this embodiment, the light-shielding performance is not lowered, as the pile threads 48a recover their original erect form.

Figure 15:
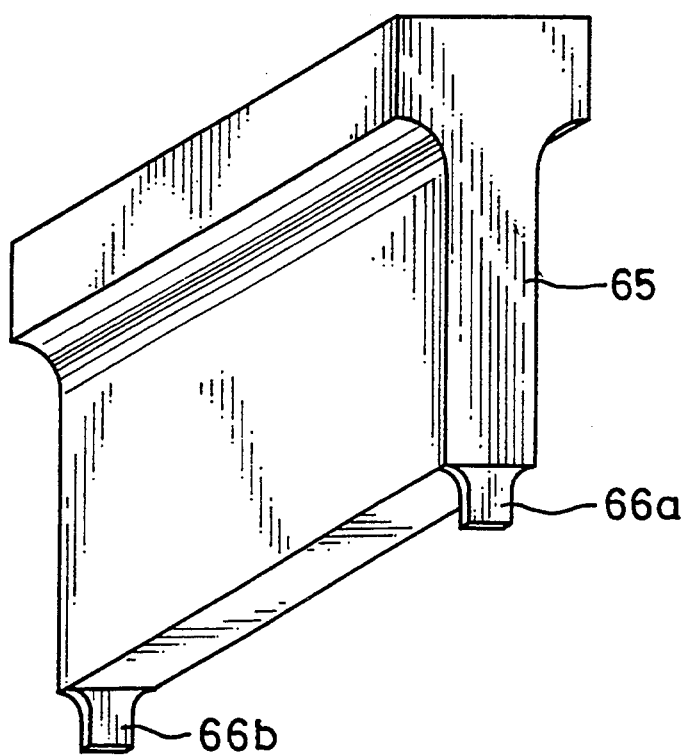
FIGS. 15 and 17 are perspective views respectively illustrating various examples of ultrasonic welding tools used in the invention.

FIG. 15 illustrates another preferred welding tool 65, which can be used in combination with the plush holding jig 42. The welding tool 65 has two horns 66a and 66b arranged along the shorter sides of the rectangular underside of the welding tool 65. The horns 66a and 66b come in contact with the light-shielding member 48 in an area larger than the horns 51, so that the light-shielding member 48 can be welded more firmly.

Figure 16:
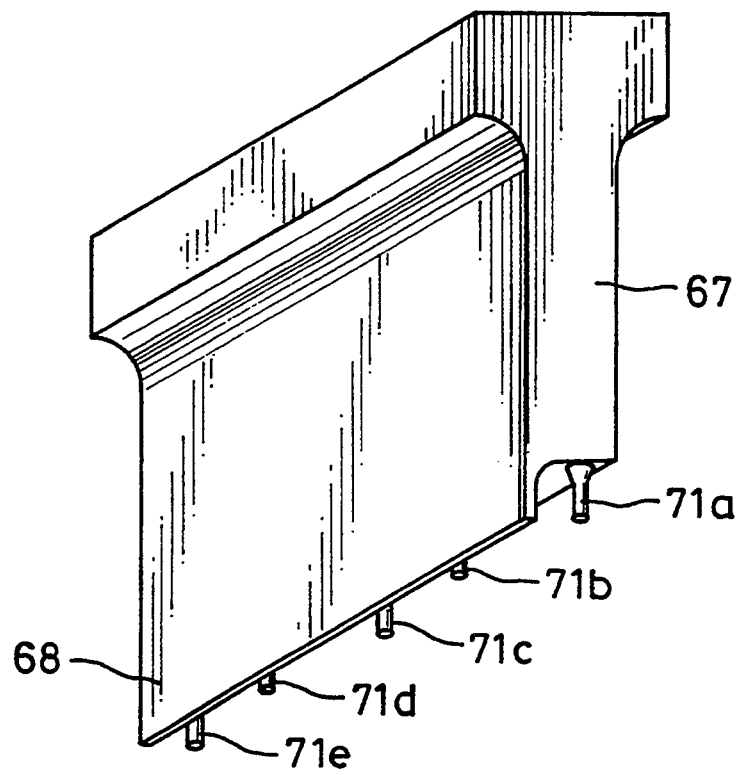

FIG. 16 illustrates still another preferred welding tool 67, which is provided with a linearly extended horn 68 along the longer side of the rectangular underside of the welding tool 67, and five spotted horns 71a to 71e. The linear horn 68 is disposed corresponding to the innermost portion of the light-shielding member 48 as viewed in the advancing direction of the photographic film of the cassette. The three spotted horns 71a, 71c and 71e are disposed corresponding to the outermost portion of the light-shielding member 48. The two spotted horns 71b and 71d are disposed corresponding to the midway portion of the light-shielding member 48. The linear horn 68 is useful in welding linearly the innermost portion, so that the leader 4a of the photographic film 4 is prevented from inadvertently passing between the light-shielding member 48 and the cassette shell 52b during advancement. The midway portion of the light-shielding member is also kept from being detached from the passageway.

Figure 17:
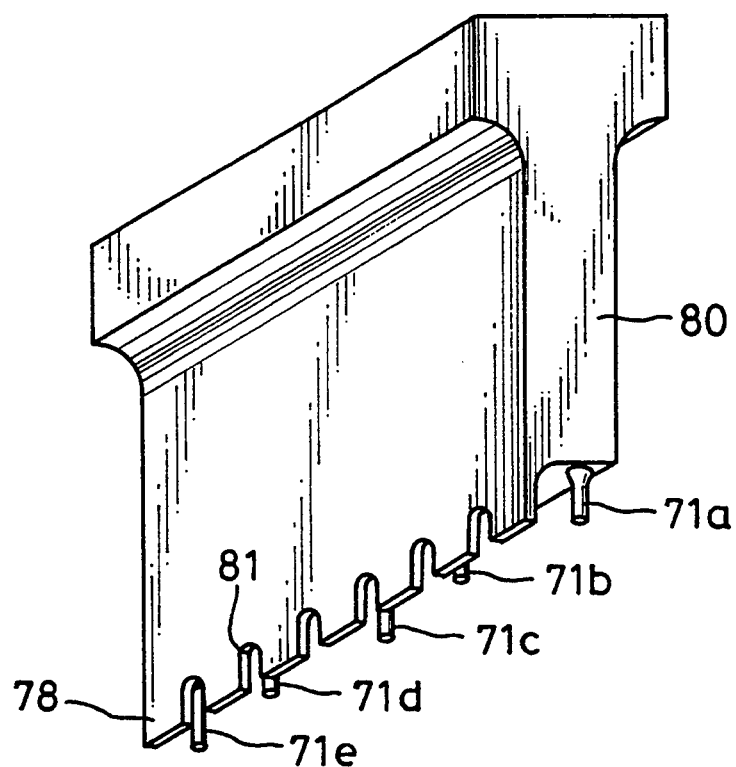

A welding tool 80 as illustrated in FIG. 17 is a variant form of the welding tool 67. A number of, e.g., six, recesses 81 are formed to define seven separate linearly extended horns 78. The contact area of the horns 78 with the light-shielding member 48 is lessened as compared with the horn 68, so that the light-shielding member 48 is protected from extra heat.

Figure 18:
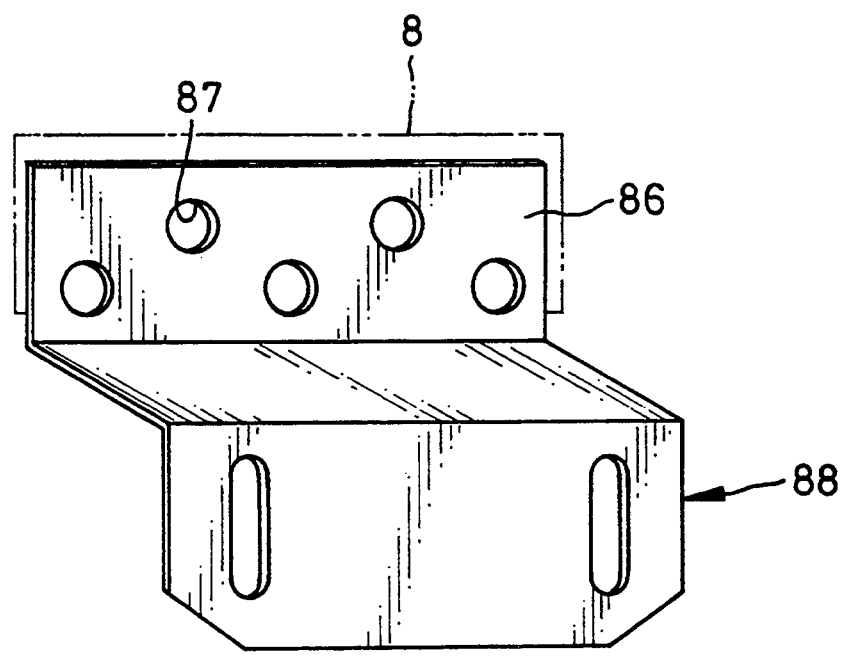
FIGS. 18 and 19 are perspective views respectively illustrating various examples of plush holding jigs used in the invention.
Figure 19:
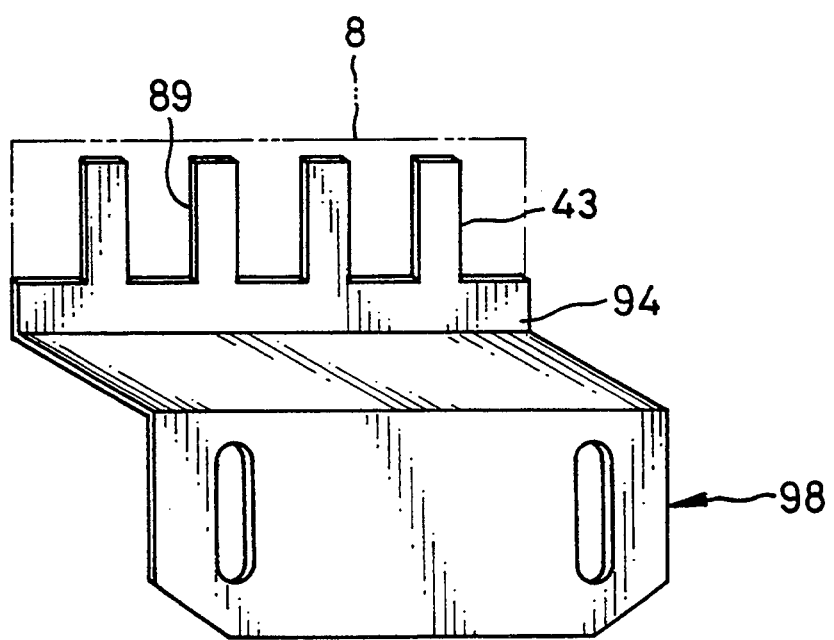
Figure 20:
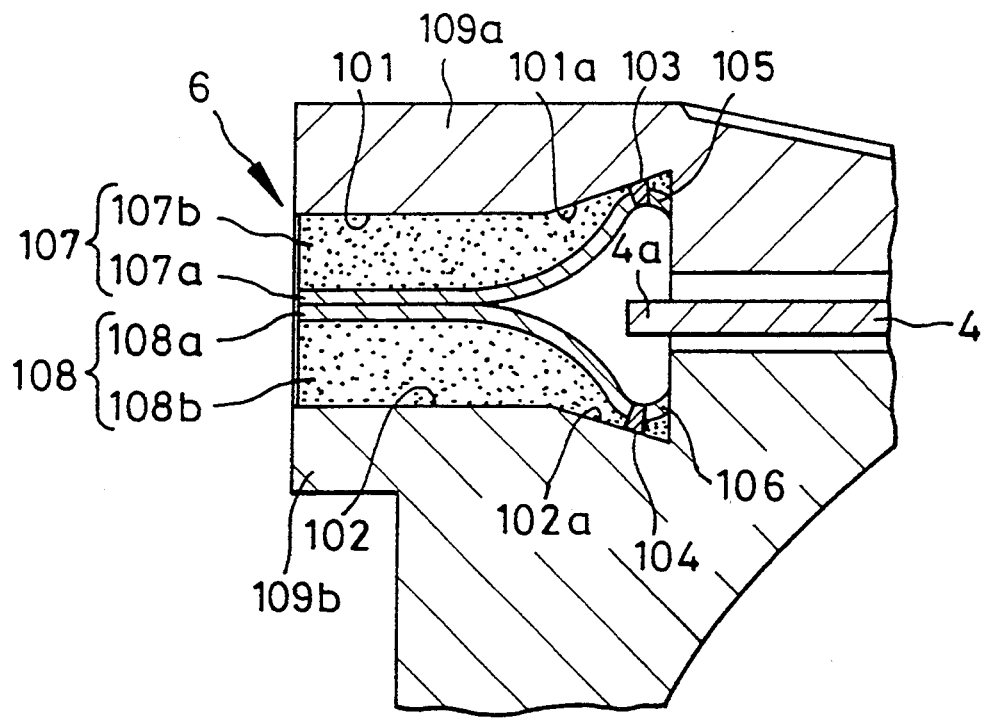
FIG. 20 is a cross section in enlargement, partly illustrating a passageway of a conventional cassette.
Figure 21:
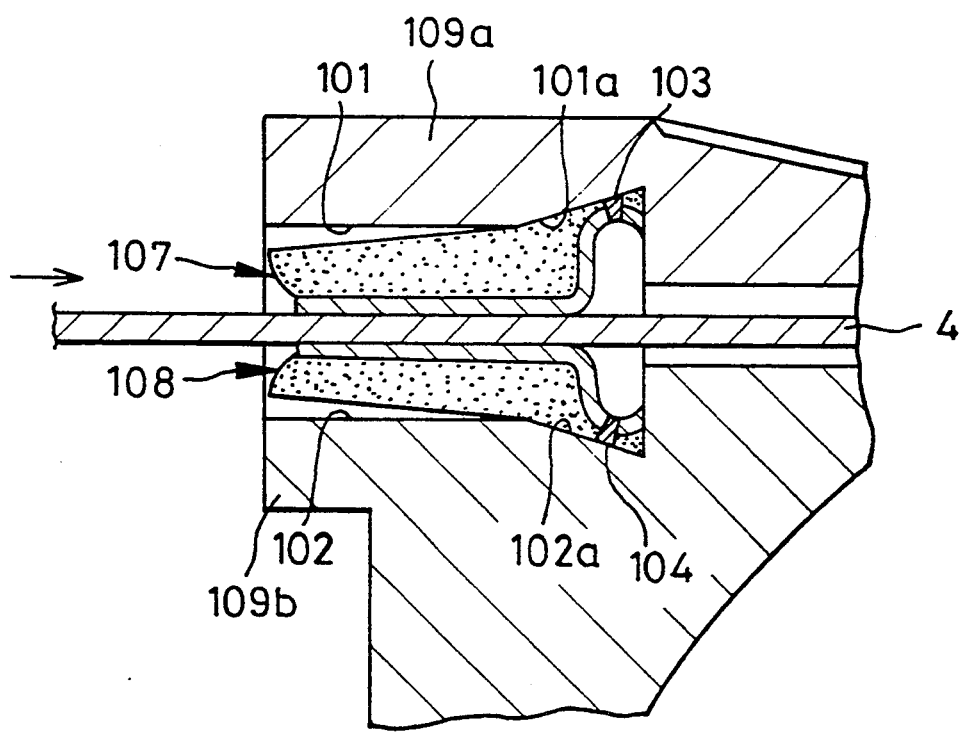
FIG. 21 is a cross section illustrating a state of rewinding the photographic film through the conventional passageway.

In combination with the welding tools 67 and 80, plush holding jigs 88 and 98 are utilized as illustrated in FIGS. 18 and 19. The holding jig 88 is provided with a holding plate 86 and five holes 87 formed therein. The holding jig 98 is provided with a holding plate 94, three recesses 89 formed therein and the two lateral recessed 43 as formerly described. The holding jigs 88 and 98 are advantageous in holding the light-shielding member 48 while allowing the horns to pass therethrough during welding.

Experiments were conducted with examples of cassette constructed with the above-mentioned welding tools. The welding tools 50, 65, 67 and 80 were manufactured such that the pressing surfaces of the spotted horns 71a to 71e and the linear horns 66a and 66b and 68 were 0.3 mm across. An ultrasonic oscillator of 40 KHz was mounted on the welding tools, and actuated in the energy mode at 50 Joules to weld the light-shielding member 48 to the attaching portion of the passageway. As a result, the welding was reliably performed by all of the novel welding tools, and the light-shielding performance was also high.

Although the present invention is applied to the cassette of which a leader of the photographic film is advanced outward from the cassette shell by/during rotation of the spool, the present invention is also applicable to any cassette for photographic film that has a cassette shell made of resin or the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A method of manufacturing a photographic film cassette including a resinous cassette shell provided with a chamber for rotatably containing a spool, photographic film being wound on said spool, said cassette shell being constituted of a pair of resinous cassette halves, a photographic film passageway being defined by opposing passage surfaces formed in said cassette shell so as to allow said photographic film to pass out of and into said chamber and a pair of light-shielding members made of pile fabric for preventing ambient light from entering said cassette shell through said passageway, rotation of said spool causes a leader of said photographic film to advance outward from said passageway; said method comprising steps of:

respectively placing said light-shielding members on said passage surfaces of said respective cassette halves;

holding said light-shielding members immovably on said passage surfaces with a rectangular holding portion of a holding jig, said holding portion having a plurality of cutouts formed therein at positions which respectively correspond to portions of said light-shielding members which are to be attached to said passage surfaces said cutouts comprising a plurality of rectangular cutouts arranged next to each other; and simultaneously inserting a plurality of welding horns of an ultrasonic welding device through said cutouts, to contact said light-shielding members, while said light-shielding members are held with said holding jig, so as to weld said light-shielding members to said passage surfaces with ultrasonic waves, said welding horns comprising a plurality of linear horns spaced at a constant interval and aligned along a portion of said welding device which corresponds to a longer side of said light-shielding members and a plurality of spotted horns formed in the shape of pins and arranged in a zig-zag fashion next to said linear horns.

2. A method as defined in claim 1, wherein there are five of said spotted horns.

3. A method as defined in claim 1, wherein said light-shielding members respectively have inner-most, midway and outermost portions as viewed relative to a direction of advancement of said photographic film out of said chamber, said linear horns contact said innermost portion, and said spotted horns contact said outermost portion.

* * * * *